US012560291B2

(12) United States Patent
Bruder

(10) Patent No.: US 12,560,291 B2
(45) Date of Patent: Feb. 24, 2026

(54) PROFILE ARRANGEMENT FOR SETTING UP EXHIBITION STANDS OR SHOP FITTINGS

(71) Applicant: HABRUSTA—Verwaltungs-GmbH, Filderstadt (DE)

(72) Inventor: Hans Bruder, Stuttgart (DE)

(73) Assignee: HABRUSTA-VERWALTUNGS-GMBH, Filderstadt (DE)

(*) Notice: Subject to any disclaimer, the term of this patent is extended or adjusted under 35 U.S.C. 154(b) by 332 days.

(21) Appl. No.: 18/113,789

(22) Filed: Feb. 24, 2023

(65) Prior Publication Data

US 2024/0068631 A1 Feb. 29, 2024

(30) Foreign Application Priority Data

Aug. 26, 2022 (DE) ............................ 102022208863

(51) Int. Cl.
*F21S 4/28* (2016.01)
*E04B 2/74* (2006.01)
(Continued)

(52) U.S. Cl.
CPC .............. *F21S 4/28* (2016.01); *E04B 2/7448* (2013.01); *F21V 17/164* (2013.01); *E04B 2002/7488* (2013.01); *F21Y 2115/10* (2016.08)

(58) Field of Classification Search
CPC ........... F21S 2/005; F21S 4/28; F21V 3/0625; F21V 15/013; F21V 17/164; E04B 2/7448; E04B 2002/7488
See application file for complete search history.

(56) References Cited

U.S. PATENT DOCUMENTS 5,134,550 A * 7/1992 Young .................. G02B 6/0096 362/431
5,829,913 A * 11/1998 Puckett ..................... E01F 9/61 404/9
(Continued)

FOREIGN PATENT DOCUMENTS

DE 9414383.8 U1 12/1994

OTHER PUBLICATIONS

Search Report issued in corresponding German Application No. 10 2022 208 863.8, dated Jul. 12, 2023 (5 pages).
(Continued)

*Primary Examiner* — James M Ference
(74) *Attorney, Agent, or Firm* — FLYNN THIEL, P.C.

(57) ABSTRACT

A profile arrangement for setting up exhibition stands or shop fittings, including a supporting profile having at least one hollow chamber extending continuously in the longitudinal direction of the supporting profile, at least two legs extending continuously in the longitudinal direction, and a covering profile. The covering profile is constructed at least partly of light-transmissive material or is constructed completely of translucent plastic. The supporting profile respectively has at free ends of the two legs snap-fitting devices interacting with matching snap-fitting devices on the covering profile. LED lighting is provided on an inner side of the supporting profile, so that during operation the LED lighting radiates light in the direction of an inner side of the covering profile.

22 Claims, 6 Drawing Sheets

(51) Int. Cl.
*F21V 17/16* (2006.01)
*F21Y 115/10* (2016.01)

(56) References Cited

U.S. PATENT DOCUMENTS

| | | | | |
|---|---|---|---|---|
| 6,223,917 | B1 * | 5/2001 | Bruder | A47B 47/0008 403/231 |
| 6,361,186 | B1 * | 3/2002 | Slayden | F21V 3/0625 362/240 |
| 6,530,675 | B1 * | 3/2003 | Van Etten | F21V 1/16 362/153.1 |
| 6,592,238 | B2 * | 7/2003 | Cleaver | F21V 5/00 362/267 |
| 6,705,751 | B1 * | 3/2004 | Liu | F21V 21/0824 362/153.1 |
| 6,880,952 | B2 * | 4/2005 | Kiraly | F21V 29/74 362/373 |
| 7,159,997 | B2 * | 1/2007 | Reo | F21V 29/70 362/240 |
| 7,223,042 | B1 * | 5/2007 | Bruder | E04B 1/585 403/255 |
| 7,559,672 | B1 * | 7/2009 | Parkyn | A47F 3/04 362/127 |
| 7,857,482 | B2 * | 12/2010 | Reo | F21V 29/70 362/225 |
| 10,113,718 | B2 * | 10/2018 | Gorman | F21K 9/27 |
| 2003/0174517 | A1 * | 9/2003 | Kiraly | F21V 29/70 362/555 |
| 2005/0265019 | A1 * | 12/2005 | Sommers | F21S 4/20 362/217.16 |
| 2006/0146540 | A1 * | 7/2006 | Reo | F21V 31/005 362/244 |
| 2007/0008717 | A1 * | 1/2007 | Flaherty | F21S 8/033 362/362 |
| 2007/0234659 | A1 * | 10/2007 | Bruder | E04B 2/7407 52/239 |
| 2008/0007945 | A1 * | 1/2008 | Kelly | F25D 21/04 362/218 |
| 2008/0148684 | A1 * | 6/2008 | Bruder | F16B 5/0685 52/764 |
| 2008/0298058 | A1 * | 12/2008 | Kan | F21V 21/005 362/240 |
| 2011/0096533 | A1 * | 4/2011 | Sekela | F21V 7/0091 362/225 |
| 2011/0149548 | A1 * | 6/2011 | Yang | F21V 15/013 362/217.1 |
| 2011/0310598 | A1 * | 12/2011 | Swafford, Jr. | A47F 3/001 362/217.02 |
| 2015/0260389 | A1 * | 9/2015 | Caron | F21V 15/015 362/218 |
| 2016/0146445 | A1 * | 5/2016 | Shine | F21K 9/20 362/249.02 |
| 2017/0138578 | A1 * | 5/2017 | Pearson | F21V 23/06 |
| 2018/0168337 | A1 * | 6/2018 | Arriagada Lama | A47B 47/047 |
| 2020/0278102 | A1 * | 9/2020 | Breslow | F21V 17/06 |
| 2020/0321908 | A1 * | 10/2020 | Anders | H02J 3/381 |
| 2020/0352354 | A1 * | 11/2020 | Arriagada Lama | A47F 3/06 |
| 2022/0057077 | A1 * | 2/2022 | Kinsley | F21V 23/02 |
| 2024/0068631 | A1 * | 2/2024 | Bruder | F21V 3/0625 |

OTHER PUBLICATIONS

International Search Report issued in corresponding International Application No. PCT/EP2023/072637, date of mailing Nov. 16, 2023 (3 pages).

Written Opinion of the International Searching Authority issued in corresponding International Application No. PCT/EP2023/072637, date of mailing Nov. 16, 2023 (9 pages).

* cited by examiner

PROFILE ARRANGEMENT FOR SETTING UP EXHIBITION STANDS OR SHOP FITTINGS

TECHNICAL FIELD

The invention is directed to a profile arrangement for setting up exhibition stands or shop fittings.

BACKGROUND AND SUMMARY

According to the invention, a profile arrangement is provided for this purpose.

A profile arrangement for setting up exhibition stands or shop fittings has a supporting profile, the supporting profile having at least one hollow chamber, extending continuously in the longitudinal direction of the supporting profile, and at least two legs, extending continuously in the longitudinal direction. The profile arrangement also has a covering profile, the covering profile consisting at least partly of light-transmissive material, in particular completely of translucent plastic. The supporting profile respectively has at the free ends of its legs snap-fitting means, which can interact with matching snap-fitting means on the covering profile. LED lighting means are provided on an inner side of the supporting profile, so that during operation the LED lighting means radiate light in the direction of an inner side of the covering profile.

The profile arrangement therefore consists of a supporting profile and a covering profile. The supporting profile consist for example of extruded aluminium and is suitable for forming load-bearing components of an exhibition stand or a shop fitting. In the connected state of the supporting profile and the covering profile, the inner side of the supporting profile lies opposite the inner side of the covering profile and the supporting profile and the covering profile form a closed cross section. Providing an inner side of the supporting profile with LED lighting means which are covered by a partly light-transmissive covering profile makes it possible to provide illumination in the profile arrangement itself. This allows the creation of exhibition stands or shop fittings in which vertical supports and/or horizontal frames are illuminated from the inside and as a result radiate light to the outside. This can create a completely new visual impression, especially in darkened rooms. For example, the supporting structure of an exhibition stand can be illuminated from the inside. Completely new possibilities for the illumination of the exhibition stand or the shop fitting itself are also achieved. The profile arrangement has for example a square or rectangular cross section and can radiate light to the outside on two sides adjoining one another and arranged perpendicularly to one another. The edge length of the covering profile is in this case advantageously equal to the edge length of the supporting profile. In the case of a rectangular or square cross section, this achieves the effect that one or two side faces of the profile arrangement radiate light completely and over the entire side face. It is however also possible to provide just illuminated strips on one or more side faces of the profile arrangement. It is even possible to use the profile arrangement according to the invention to form a support or frame which has a square or rectangular cross section and radiates light on all four sides. Also in such a case it can be provided that it is not the complete side faces of the profile arrangement that respectively radiate. It goes without saying that profile arrangements with a round or oval cross section, which give off light to the outside either substantially over their entire extent or only over part of their extent, may also be provided. The supporting profile has at least one hollow chamber extending continuously in the longitudinal direction of the supporting profile. A so-called turnbuckle, which has for example two snap-fitting hooks protruding beyond the end face of the supporting profile, is pushed into this hollow chamber at the end face and is then arrested in the hollow chamber at the end face. With these snap-fitting hooks, the supporting profile can then be anchored in an undercut groove of a further supporting profile, in that the snap-fitting hooks are braced against the undercut from the inside. Such a connection with turnbuckles and undercut grooves is known in trade-fair construction profiles. The hollow chamber may however also be used for example to arrange elements of a screw connection, for example nuts and screw bolts or the like. By finding a suitable match between the light transmissivity or diffusing effect of the covering profile and the radiating angle and the number of LED lighting means, substantially uniform illumination from the inside of the whole covering profile over the entire surface area, in particular side faces, of the covering profile can be provided. This gives the impression that the covering profile itself lights up, in particular over its entire side face, since no discrete light sources can be seen through the covering profile and at least one side face of the covering profile is completely taken up by the covering profile. The LED lighting means are in this case advantageously arranged on an inner side of the supporting profile over the entire length of the supporting profile, so that the profile arrangement radiates light over its entire length.

In a development of the invention, the covering profile has exactly two legs, the outer sides of the legs of the covering profile being arranged perpendicularly to one another, at least in the region of their free ends.

As a result, the covering profile can cover an angle of 90° and for example supplement a supporting profile to form a rectangular or square profile arrangement. The profile arrangement can as a result radiate light over an angle of 90°. The two legs of the covering profile can perpendicularly adjoin one another at their connecting point, but they may also be connected to one another by means of a rounded portion. The length of the legs of the covering profile may be equal to the length of the legs of the supporting profile.

In a development of the invention, the supporting profile has exactly two legs, the outer sides of the at least two legs being arranged at right angles to one another and the covering profile being provided with snap-fitting means at the free ends of the legs of the covering profile, which can interact with the snap-fitting means at the free ends of the legs of the supporting profile.

As a result, the covering profile and the supporting profile form an elongated profile arrangement with a rectangular or square cross section. However, a rhomboidal cross section is also possible for example. The snap-fitting of the covering profile by means of its snap-fitting means into the snap-fitting means on the supporting profile allows the covering profile to be fastened on the supporting profile in a very easy way, in particular to be fastened on the supporting profile without any tools. The snap-fitting means on the covering profile are advantageously formed as projections extending continuously in the longitudinal direction of the covering profile and the snap-fitting means on the supporting profile are advantageously formed as undercut grooves extending continuously in the longitudinal direction of the supporting profile. In this way, the covering profile can be fastened on the supporting profile securely and at the same time without any tools and can also be non-destructively detached again from the supporting profile. As a result, two side faces of the profile arrangement are formed by the covering profile and can be completely illuminated.

In a development of the invention, the two legs of the supporting profile are arranged at an angle of 90° to one another and the legs of the covering profile are arranged at an angle of 90° to one another.

In this way, the profile arrangement in the connected state of the supporting profile and the covering profile has a rectangular or square cross section.

In a development of the invention, the LED lighting means have at least a first strip and a second strip with LEDs arranged one behind the other in the longitudinal direction, a light radiating direction of the two strips being aligned substantially perpendicularly to one another.

In this way, light can be given off in two directions perpendicular to one another, for example in the direction of a first leg of the covering profile and in the direction of a second leg of the covering profile, the two legs being arranged at a 90° angle to one another. In this way, very uniform illumination of the covering profile can be achieved. In this case, a centre line of the radiating cone or radiating angle is regarded as the light radiating direction. When there are multiple LEDs arranged in line with one another, which form an LED strip, the centre lines of the radiating cones of the LEDs arranged one behind the other are also in line. A light radiating direction of the LED strip is thereby established. Substantially perpendicularly means in this case an angle between 85° and 95°, in particular 90°.

In a development of the invention, a third strip is provided with LEDs arranged one behind the other in the longitudinal direction, a light radiating direction of the third strip being arranged at an angle of approximately 45°, in particular between 40° and 50°, to the light radiating direction of the first strip and to the light radiating direction of the second strip.

In this way, an angular range of 90° or even somewhat more than 90° can be uniformly illuminated. For example, a light radiating direction of the first LED strip may be aligned perpendicularly to a first leg of the covering profile, a light radiating direction of the second strip may be aligned perpendicularly to a second leg of the covering profile and a light radiating direction of the third strip may be directed towards a connection between the first leg and the second leg of the covering profile. In this way, a very uniform illumination of the covering profile can be achieved, and in particular, when using a translucent covering profile, the impression that the covering profile radiates light over its entire surface area can be achieved, since no individual light sources can be seen from outside the profile arrangement.

In a development of the invention, the multiple strips with LEDs arranged one behind the other in the longitudinal direction are arranged on a common, flexible substrate.

In this way, not only the distance between individual LEDs in the longitudinal direction but also the distance between the individual LEDs in the transverse direction can be maintained exactly, which considerably facilitates the mounting of the profile arrangement according to the invention. The flexible formation of the substrate allows the individual LED strips to be arranged at different angles to one another, without having to fear that a distance between the individual LEDs in the transverse direction changes over the length of the LED strip. The substrate is in this case advantageously constructed in such a way that a modular structure is provided and the substrate can be cut through at predefined distances, for example 4 cm, without impairing the electrical connection, and with it the operability of the LEDs on the part that is not cut off.

In a development of the invention, the supporting profile has fastening areas for LEDs, the fastening areas being arranged at least partially at an angle to one another.

In a development of the invention, the supporting profile has fastening areas for LEDs which are arranged on a surface area that is curved and continuous in the longitudinal direction of the supporting profile.

In a development of the invention, the legs of the supporting profile are in each case tapered towards the free end.

In this way, very little shading by the free ends of the legs of the supporting profile can be achieved in the region of the connection to the covering profile. The inner sides of the legs are advantageously formed such that a reflection of the light impinging on the inner side of the legs in the direction of the inner side of the covering profile takes place.

In a development of the invention, the legs of the supporting profile extend on the inner side in a curved form towards the free end.

On the inner side, which is facing the inner side of the covering profile, the legs of the supporting profile are advantageously curved convexly towards the inner side of the covering profile. This allows a reflection of the light impinging on the legs of the supporting profile towards the covering profile to be achieved.

In a development of the invention, the legs of the supporting profile are mirrored, polished or white on the inner side.

In this way, very good reflection can be achieved. If a diffuse reflection is desired, for example a slightly rough, but still reflective surface may also be provided on the inner side.

In a development of the invention, the covering profile is formed in one piece from translucent polycarbonate.

Translucent polycarbonate is light-transmissive to a certain degree, but no objects can be seen through the translucent polycarbonate. A covering profile of polycarbonate illuminated from the inside consequently does not allow the individual discrete LEDs that cause the illumination to be seen, but instead gives the impression of being uniformly self-illuminating over its entire surface. In addition, polycarbonate can be produced well, for example by extrusion or pultrusion, and on the one hand has adequate strength and on the other hand is sufficiently elastic and impact-resistant to be connected to a supporting profile without any problem, for example by means of snap-fitting means.

In a development of the invention, a groove is respectively provided at the free ends of the legs of the supporting profile, it being possible for the free end of a leg of the covering profile to be snap-fitted into the respective groove.

The groove is advantageously undercut at the free ends of the legs of the supporting profile, in order to allow the covering profile to be reliably snap-fitted. The free end of the legs of the covering profile advantageously has for this purpose a strip-shaped projection extending continuously in the longitudinal direction of the covering profile, which is made to match the undercut groove of the supporting profile.

In a development of the invention, the continuous hollow chamber of the supporting profile has an octagonal cross section.

A hollow chamber with an octagonal cross section allows the insertion of a turnbuckle at least in two alignments perpendicular to one another, possibly even in two positions perpendicular to one another and two positions respectively inclined by 45° thereto.

In a development of the invention, the outer sides of the legs of the supporting profiles are respectively provided with at least one undercut groove.

Such undercut grooves serve for connecting further profile arrangements perpendicularly to the first profile arrangement, a turnbuckle engaging in the undercut groove and reliably connecting the end face of the perpendicular profile arrangement to the first profile arrangement.

In a development of the invention, the voltage supply and/or the control unit for the LED lighting means have been pushed into a hollow chamber of the supporting profile.

In this way, the voltage supply and/or the control unit can be accommodated in the profile arrangement itself, so that for example only a thin cable has to be led away from the profile arrangement. It goes without saying that the arrangement of an energy store in the profile arrangement is also possible. However, such an embodiment is generally only suitable for operation of the LED lighting means for a short time.

In a development of the invention, the voltage supply and/or the control unit are arranged in a milled cut-out in the supporting profile. For example, a side face of a hollow chamber extending continuously in the longitudinal direction is milled into the supporting profile. This milled cut-out then allows the voltage supply and/or the control unit to be arranged and secured in the supporting profile in a very easy way. For changing the control unit and/or the voltage supply, the profile arrangement does not have to be accessible from its end face. In this way, the voltage supply and/or the control unit can be changed even in the installed state of the profile arrangement. By simply removing the covering profile, it is possible as a result to change the control unit and/or the voltage supply.

In a development of the invention, the profile arrangement has vertical supports and horizontal frames, both the supports and the frames respectively being formed by means of a supporting profile and a covering profile.

In this way, for example the entire supporting structure of an exhibition stand or a shop fitting can be formed as self-illuminating.

Further features and advantages of the invention emerge from the claims and the following description of preferred embodiments of the invention in conjunction with the drawings. Individual features of the various embodiments described in the description and shown in the drawings can be combined with one another in any way desired without going beyond the scope of the invention. This also applies to the combination of individual features without further individual features in conjunction with which they are shown or described.

BRIEF DESCRIPTION OF THE DRAWINGS

FIGS. 7A-7H show a number of front views of profile arrangements according to the invention of different embodiments, in which:

FIG. 7A shows an embodiment of a supporting profile similar to that of FIG. 1, FIG. 7B shows the profile arrangement of FIG. 2, FIG. 7C shows a further embodiment of a supporting profile similar to that of FIG. 1, FIG. 7D shows yet a further embodiment of a supporting profile without undercut grooves on its outer sides, FIG. 7E shows another embodiment of a supporting profile with a curved or angled fastening area, FIG. 7F shows a further embodiment of a supporting profile, FIG. 7G shows yet another embodiment of a supporting profile with rectangular grooves, FIG. 7H shows a further embodiment of a supporting profile.

DETAILED DESCRIPTION

Figure 1:
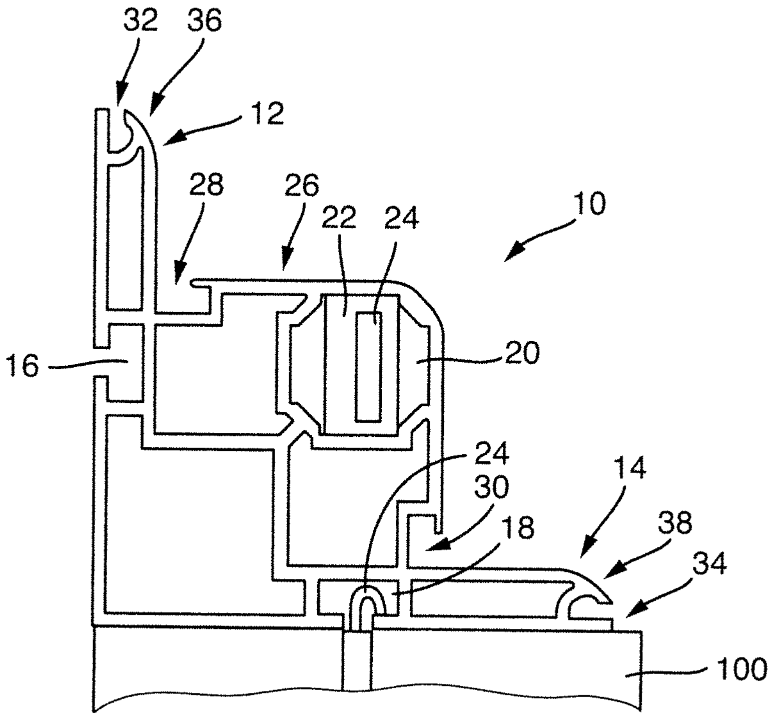
FIG. 1 shows a front view of a supporting profile for a profile arrangement according to the invention according to a first embodiment.

FIG. 1 shows a supporting profile 10 for a profile arrangement according to the invention in a front view. The supporting profile 10 has a first leg 12 and a second leg 14, the outer sides of the two legs 12, 14, which lie on the left and at the bottom in FIG. 1, being arranged perpendicularly to one another. Arranged approximately centrally on the outer side of each leg and undercut on both sides is a groove 16 and 18. The cross section of the supporting profile 10 that can be seen in FIG. 1 extends continuously in the longitudinal direction of the supporting profile. The supporting profile 10 is provided with a hollow chamber 20 which has a cross section, which is approximately octagonal, which extends continuously in the longitudinal direction of the hollow profile and in which a turnbuckle 22 is arranged. It can be seen in FIG. 1 that the turnbuckle 22 can be inserted into the hollow chamber 20 not only in the alignment shown in FIG. 1 but also in alignments perpendicular thereto. The turnbuckle 22 has an arresting hook 24, which protrudes beyond the end face of the turnbuckle. The hook 24 of another turnbuckle, which has been inserted into another supporting profile 100, can be seen in the groove 18 in FIG. 1. By means of an eccentric arrangement, the hook 24 can be drawn back. In order to fasten the supporting profile 100 perpendicularly on the supporting profile 10, a turnbuckle is inserted into the hollow chamber of the supporting profile 100 and pushed against the outer side of the leg 14 of the supporting profile 10 until the hook 24 engages behind the undercut in the groove 18. Then, the eccentric of the turnbuckle is actuated and moved beyond a dead centre. The hook 24 then keeps the supporting profile 100 securely on the supporting profile 10. Such a possibility of fastening supporting profiles on one another by means of turnbuckles 22 is known.

The supporting profile 10 has further hollow chambers extending continuously in the longitudinal direction, which are either provided for static reasons or, as still to be explained, serve for pushing in or inserting a voltage supply and a control unit.

The supporting profile 10 has on its inner side a central element 26, in which the cross-sectionally octagonal hollow chamber 20 is arranged. Respectively provided at the transition of the central element 26 to the leg 12 and at the transition from the central element 26 to the leg 14 and undercut on one side is a groove 28 and 30. Turnbuckles or other functional parts may also be fastened in these undercut grooves 28, 30, but power cables for example may also be placed into these grooves. The central element 26 connects the inner sides of the legs 12, 14 and ensures that the supporting profile 10 can withstand high mechanical forces, so that even large exhibition stands, generally supporting structures, can be set up.

Provided at the free end of the leg 12 is an undercut groove 32 and provided at the free end of the leg 14 is an undercut groove 34, the grooves 32, 34 being formed continuously in the longitudinal direction of the supporting profile 10 and identically to one another. The undercut of the grooves 32, 34 is less pronounced and has a rounded shape. The grooves 32, 34 are provided for the snap-fitting of a covering profile, see FIG. 2.

The inner sides of the legs 12, 14 are in each case formed as tapered in their end region 36 and 38. The tapering is achieved by the inner sides of the legs extending in a convexly curved form towards the end. The curvature is in this case respectively directed away from the outer side of the legs 12, 14. As still to be explained, as a result not only a tapering of the legs is achieved but also a reflection of the light impinging on the curved regions 36, 38 in the direction of a covering profile, cf. FIG. 2.

Figure 2:
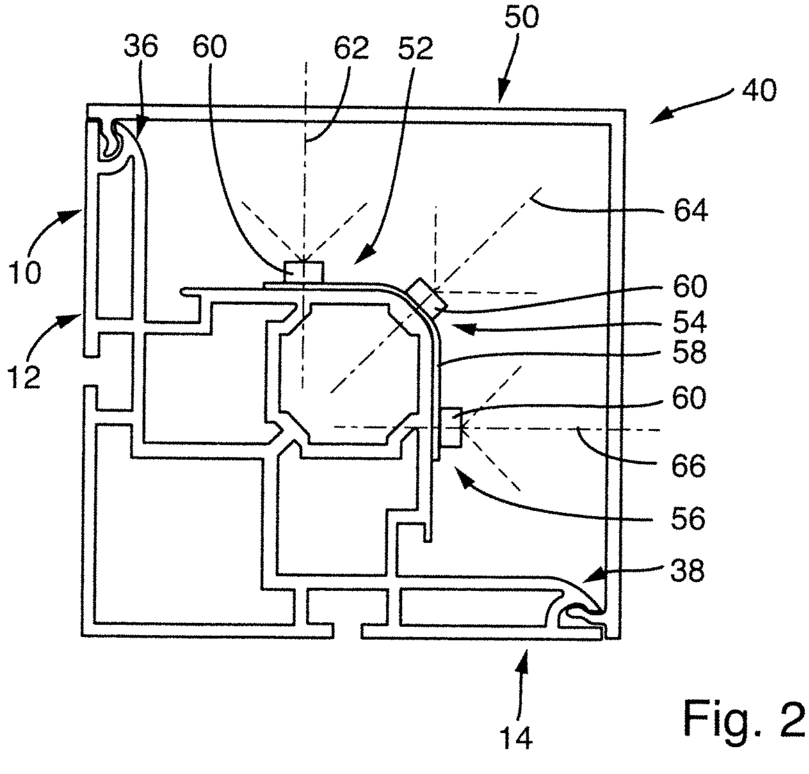
FIG. 2 shows a profile arrangement according to the embodiment of FIG. 1 with a supporting profile and a covering profile.

FIG. 2 shows a profile arrangement 40 with the supporting profile 10 already explained on the basis of FIG. 1 and a covering profile 50 placed onto the supporting profile 10. The covering profile 50 has two legs, arranged perpendicularly to one another and in each case formed flat on the outer side. In the state shown in FIG. 2, in which the supporting profile 10 and the covering profile 50 are connected to one another, the profile arrangement 40 consequently has a square, generally rectangular, cross section. It can be seen from FIG. 2 that the free ends of the legs of the covering profile 50 lie on the free ends of the legs 12, 14 of the supporting profile 10. The covering profile 50 is produced from translucent plastic, in particular translucent polycarbonate, and is illuminated from the inner side. Seen from above and seen from the right in FIG. 2, the entire upper side face and the entire right side face of the profile arrangement 40 appears to be self-illuminating as a result.

In order to illuminate the covering profile 50 from the inner side, LED lighting means in the form of three LED strips 52, 54, 56, which are arranged on a common, flexible substrate 58, are arranged on an inner side of the supporting profile 10. Each of the LED strips 52, 54, 56 has in this case multiple LEDs 60 arranged one behind the other, only one LED 60 respectively in the region of the LED strips 52, 54, 56 being able to be seen in FIG. 2.

A light radiating direction 62, 64 and 66 is depicted by dashed-dotted lines on each of the LEDs 60. It can be seen that the light radiating direction 62 of the first LED strip 52 is aligned perpendicularly to the light radiating direction 66 of the second LED strip 56. The light radiating direction 62 of the first LED strip 60 is in this case aligned perpendicularly to a leg of the covering profile 50. The light radiating direction 62 consequently impinges perpendicularly on the inner side of the first leg of the covering profile 50, which lies at the top in FIG. 2.

The light radiating direction 66 of the second LED strip 56 is aligned perpendicularly to a second leg of the covering profile 50, which is arranged on the right in FIG. 2. The light radiating direction 66 of the second LED strip 56 consequently impinges perpendicularly on the inner side of the second leg of the covering profile 50. A radiating angle is also respectively indicated by dashed lines on the LEDs 60. The light radiating directions 62, 64, 66 in each case form the angle bisector of the radiating angle.

The light radiating direction 64 of the third LED strip 54 is arranged at an angle of 45° to the light radiating direction 62 of the first LED strip 52 and at an angle of 45° to the radiating direction 66 of the second LED strip 56. The light radiating direction 64 of the third LED strip 54 consequently lies at an angle of 45° to the first leg and to the second leg of the covering profile 50.

It can be seen in FIG. 2 that the third LED strip 54 is provided for the illumination of the corner region of the covering profile 50, the first LED strip 52 for the illumination of the leg of the covering profile lying at the top in FIG. 2 and the third LED strip 56 for the illumination of the leg of the covering profile 50 lying on the right in FIG. 2.

It can also be seen in FIG. 2 that only a very small region at the free end of the leg of the covering profile 50 lying at the top in FIG. 2 is shaded by the curved portion 36 at the free end of the first leg 12 of the supporting profile 10. In the same way, only a very small peripheral region of the leg of the covering profile 50 lying on the right in FIG. 2 is shaded by the curved portion 38 at the free end of the second leg 14 of the supporting profile 10.

For fastening the three LED strips 52, 54, 56, the flexible substrate 58 is placed onto a curved or at least angled surface on the inner side of the supporting profile 10 and fastened, for example adhesively fixed. As a result, the LED strips 52, 54, 56 are automatically aligned in the described way. The curved fastening area for the substrate 58 or the fastening area for the substrate 58 provided with multiple portions arranged at an angle to one another forms at the same time part of the outer side of the octagonal hollow chamber 20 of the supporting profile 10.

Figure 3:
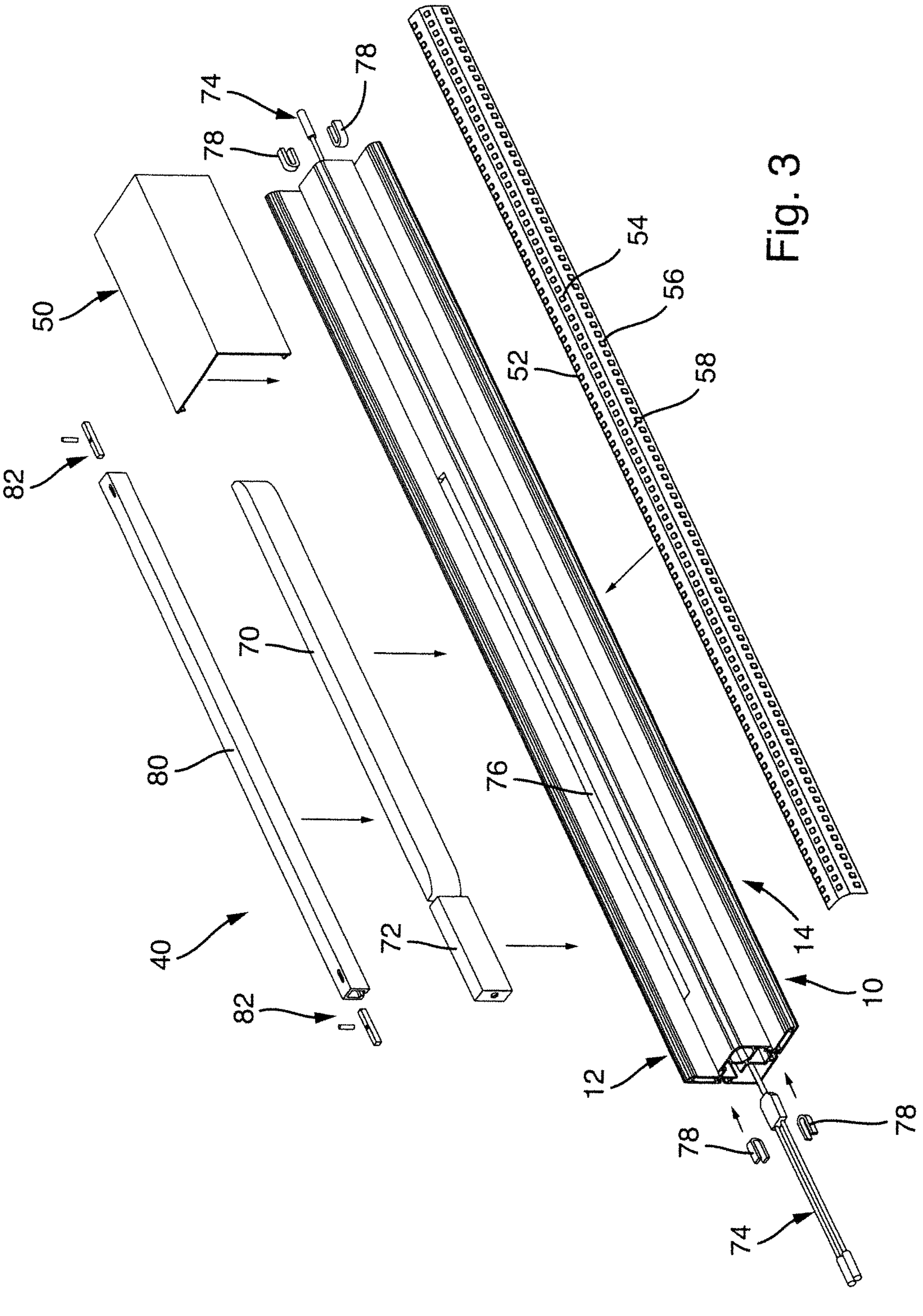
FIG. 3 shows a pulled-apart representation of a profile arrangement according to the embodiment of FIG. 1.

FIG. 3 shows a pulled-apart representation of the profile arrangement 40 of FIG. 2. The supporting profile 10 is provided with the two legs 12, 14. Only a short portion of the covering profile 50 is shown. As indicated by an arrow, the covering profile 50 is placed onto the supporting profile 10 and then snap-fitted onto it, as can be seen in FIG. 2. The three LED strips 52, 54, 56 are arranged on the common substrate 58 and are fastened on the inner side of the supporting profile 10.

For operating the LED lighting means, an electrical energy supply 70 is provided. For controlling the LED lighting means, a control unit 72 is provided. In order to supply the energy supply 70 with electrical energy, connection cables 74 are provided. It goes without saying that during operation the connection cables 74 are connected to the energy supply 70, which for the sake of simplicity is not shown. The connection cables may for example be connected to the electrical supply grid or else to a storage battery. In the same way, it goes without saying that the LED lighting strips 52, 54, 56 are connected to the control unit 72 and the energy supply 70 by way of conductor tracks on the common substrate 58 and cables that are not shown.

In order to be able to arrange the energy supply 70 and the control unit 72 inside the supporting profile 10, a rectangular milled cut-out 76 is provided on the inner side of the supporting profile 10. With this milled cut-out 76, also see FIG. 5, two hollow chambers of the supporting profile 10 are opened over a certain length. As shown by arrows, as a result the energy supply 70 and the control unit 72 can be inserted into these hollow chambers of the supporting profile 10. The connection cables 74 are led out at one end face or else at both end faces of the supporting profile 10. U-shaped clips 78 are inserted into the respective end face of the supporting profile 10 and serve as cable protection, if for example the connection cables 74 have to be laid in an angled manner in order to be led into the next profile arrangement.

In order to keep the energy supply 70 and the control unit 72 inside the hollow chambers of the supporting profile 10, a closure profile 80 is provided. The closure profile 80 is made to match the milled cut-out 76 in length and width. Provided at both ends of the closure profile 80 are sliding bolts 82, with which the closure profile 80 can be kept in the intended position on the supporting profile 10. As a result, the energy supply 70 and the control unit 72 can also be kept securely in the supporting profile 10 by the closure profile 80. The control unit 72 serves for example for controlling a luminosity of the LED lighting means or a colour of the LED lighting means 60. The control unit 72 can be activated from outside the profile arrangement 40 for example by means of a wireless remote control.

The control unit 72 may be formed in a suitable way, in order for example also to automatically bring about a change in luminosity or change in colour of the LED lighting means.

Figure 4:
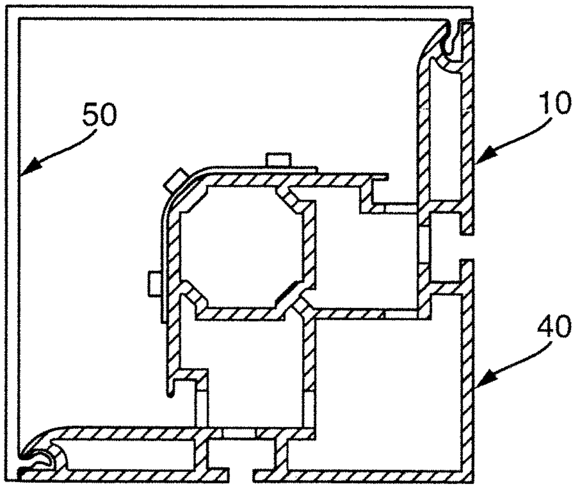
FIG. 4 shows a first sectional view of the profile arrangement of FIG. 3.

The representation of FIG. 4 shows a sectional view through the supporting profile 10 and the covering profile 50 of the profile arrangement 40 of FIG. 3 in the region of the end arranged at the bottom left in FIG. 3. In this region, milled cut-outs are provided in the supporting profile 10 in order to lead the connection cables 74 out of the hollow chambers of the supporting profile 10, see FIG. 3.

Figure 5:
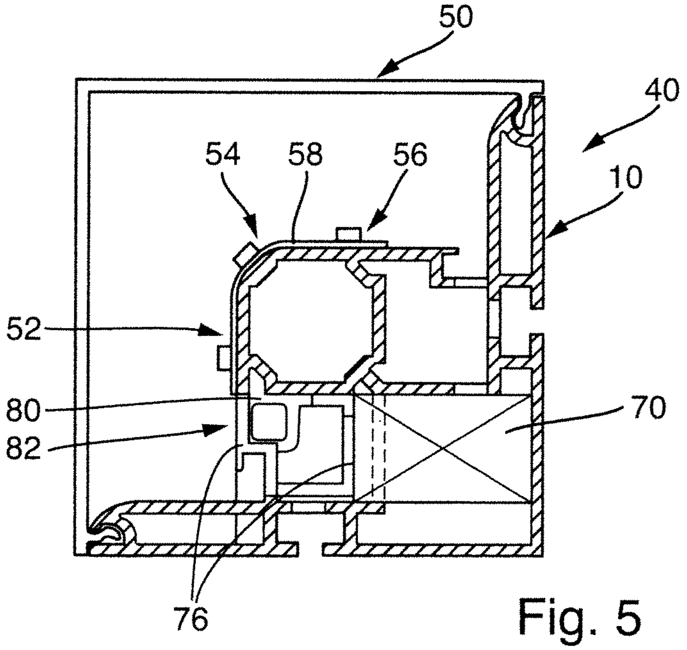
FIG. 5 shows a second sectional view of the profile arrangement of FIG. 3, cut at a different position as seen in the longitudinal direction.

FIG. 5 shows a further sectional view of the profile arrangement 40 in the region in which the closure profile 80 has been placed onto the milled cut-out 76. The closure profile 80 is anchored on the supporting profile 10 by means of the sliding bolts 82 and as a result keeps the energy supply unit 70 and the control unit 72 (not shown) in the supporting profile 10. The hollow chambers of the supporting profile are accessible from the side through the milled cut-out 76.

In FIG. 4 and FIG. 5, the snap-fitting projections at the free ends of the two legs of the covering profile 50, which have been snapped-fitted into the undercut grooves at the free ends of the legs of the supporting profile 10, can also be seen well.

In addition, the flexible substrate 58 with the three LED strips 52, 54, 56 can also be seen in FIGS. 4 and 5.

Figure 6:
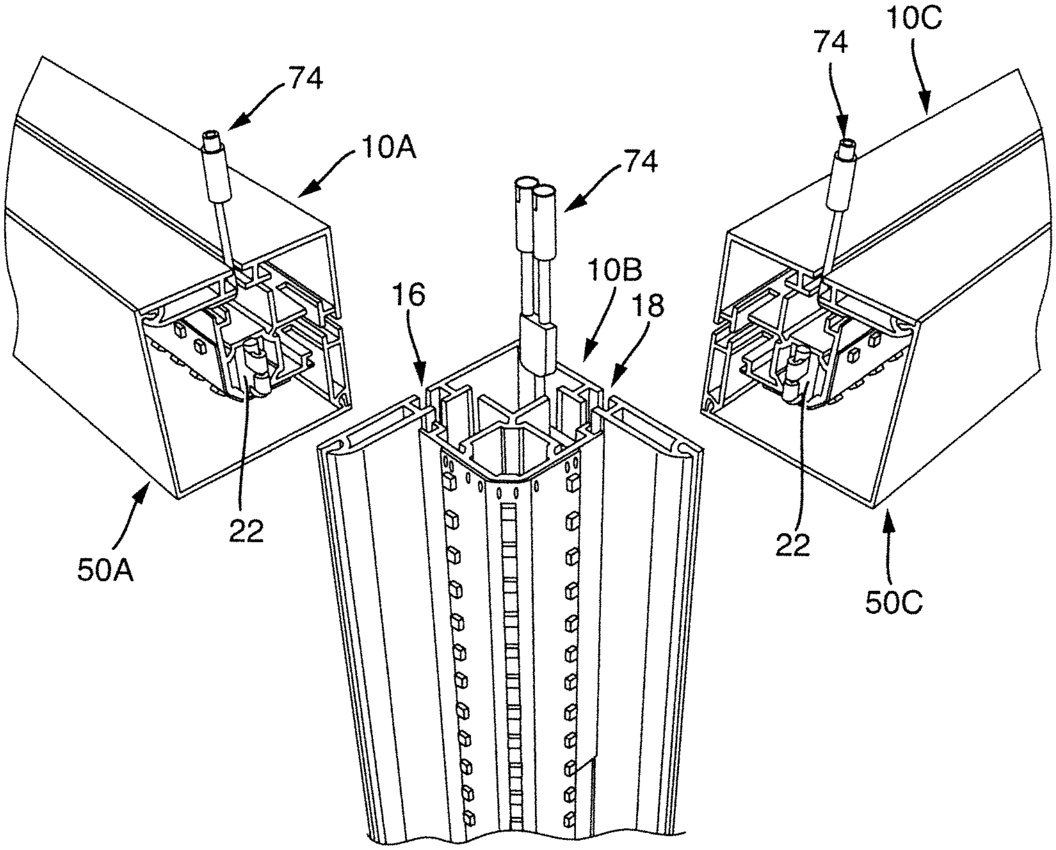
FIG. 6 shows a partial representation of a profile arrangement according to the invention with two horizontal frames and a vertical support.

FIG. 6 shows a representation with three supporting profiles 10A, 10B and 10C, which are each provided with LED lighting means. In the representation of FIG. 6, only the supporting profiles 10A, 10C are respectively provided with a covering profile 50A, 50C. It goes without saying that a covering profile (not shown) can also be snap-fitted onto the supporting profile 10B in FIG. 6.

The supporting profile 10B is vertically arranged and forms a portion of a support. The two supporting profiles 10A, 10C are each horizontally arranged and respectively form part of a horizontal frame.

In each of the supporting profiles 10A, 10C there can be seen a turnbuckle 22, which protrudes beyond the end face of the respective supporting profile 10A, 10C and serves for connecting the supporting profiles 10A, 10C to the supporting profile 10B. For this purpose, the hooks of the turnbuckles 22 of the supporting profile 10A are introduced into the undercut groove 16 on the outer side of the supporting profile 10B and snap-fitted there and the hooks of the turnbuckle 22 of the supporting profile 10C are introduced into the undercut groove 18 on the outer side of the other leg of the supporting profile 10B and snap-fitted there. The eccentrics of the turnbuckles 22 are in this case operated through openings in the supporting profile, from the respectively rearwardly aligned outer side of the supporting profiles 10A, 10C.

The profile arrangement of FIG. 6 consequently makes it possible to illuminate uniformly two outer surfaces of the covering profile 50*a*, two outer surfaces of the covering profile 50C and two outer surfaces of the covering profile (not shown) that is placed onto the supporting profile 10B. As a result, a spatial corner that radiates light is created from a vertical support and two horizontal frames.

It can also be seen in the representation of FIG. 6 how the connection cables 74 are led out of the supporting profiles 10A, 10B, 10C.

Figure 7A:
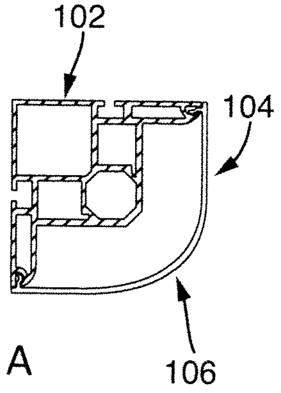

FIGS. 7A-7H illustrate various embodiments of the profile arrangement according to the invention. In the case of all the embodiments, at least one side face of the profile arrangements can be completely illuminated. Seen in cross section, the edge length of the covering profile corresponds substantially to the edge length of the supporting profile. FIG. 7A in this case shows a supporting profile 102, which with the exception of the absent undercut grooves 28, 30, cf. FIG. 1, is designed identically to the supporting profile 10 and is provided with a covering profile 104, the two legs of which, arranged perpendicularly to one another, are connected by means of a rounded region 106.

Figure 7C:
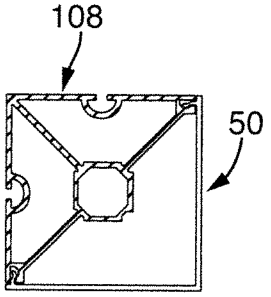
Figure 7F:
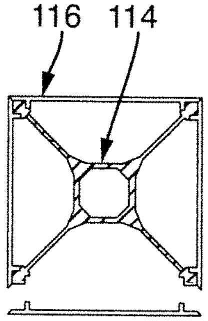
Figure 7B:
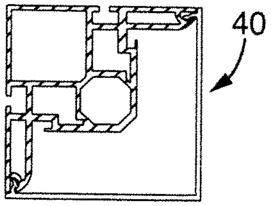

FIG. 7B shows the profile arrangement 40 of FIG. 2.

FIG. 7C shows a supporting profile 108, which is formed slightly differently than the supporting profile 10.

Figure 7D:
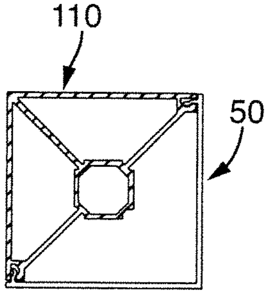

FIG. 7D shows a supporting profile 110, which as a difference from the supporting profile 108 is not provided with undercut grooves on its outer sides.

Figure 7E:
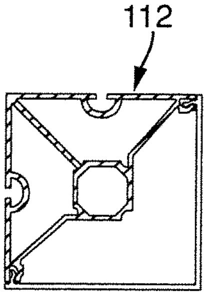

FIG. 7E shows a supporting profile 112, the internal structure of which is formed slightly differently than in the case of the supporting profiles 108, 110 and which as a result has however a curved or angled fastening area for a flexible substrate for LED lighting means.

FIG. 7F shows a supporting profile 114, which is formed in the shape of a star and has altogether four legs, which between each of them form an angle of 90°. Two covering profiles 116 may be respectively arranged at the free end of the legs. The altogether four covering profiles 116 are all translucently formed and as a result make it possible to create a profile arrangement which is illuminated from inside on four sides.

Figure 7G:
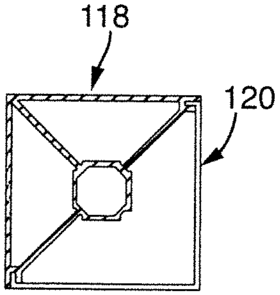

FIG. 7G shows a supporting profile 118, which is provided at the free ends of its legs with cross-sectionally rectangular grooves, which consequently do not have an undercut. A covering profile 120 is inserted into these grooves by the free ends of its legs.

Figure 7H:
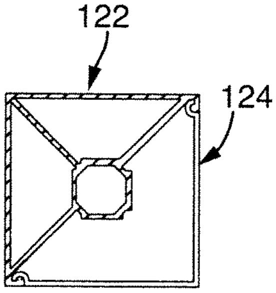

FIG. 7H shows a supporting profile 122, on which a covering profile 124 has been snap-fitted. The covering profile 124 does not however extend beyond the free ends of the legs of the supporting profile 122.

Figure 8:
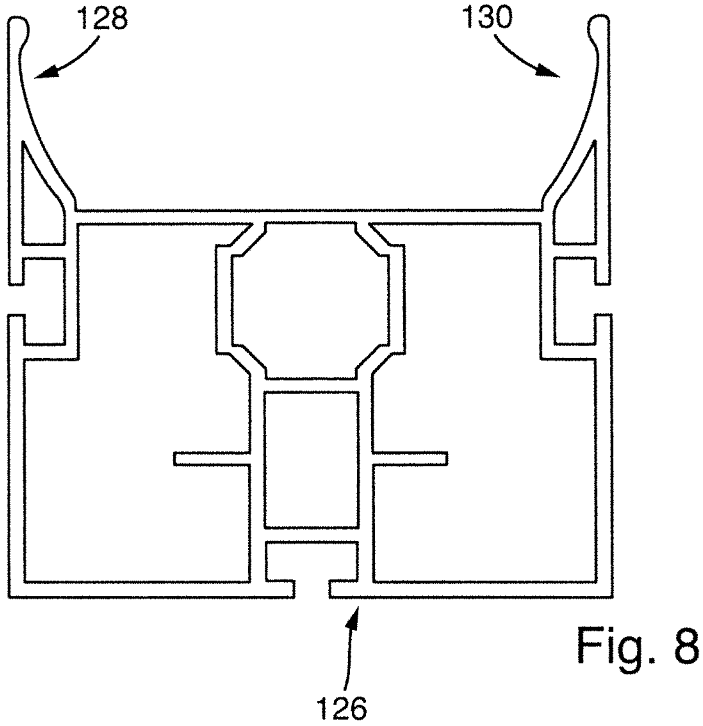
FIG. 8 shows a front view of a supporting profile for a profile arrangement according to the invention according to a further embodiment.

FIG. 8 shows a further supporting profile 126. The supporting profile 126 has three closed outer sides, in each of which an undercut groove is arranged. In its region at the top in FIG. 8, the supporting profile 126 forms a U-like cross section with two legs 128, 130. The two legs 128, 130 are each provided at their free ends with a strip-shaped projection, which has a rounded outer contour and respectively extends inwards, towards the opposite leg 128 or 130. A base of the U-like cross section is designed as flat and serves for the arrangement of multiple LED lighting means.

Figure 9:
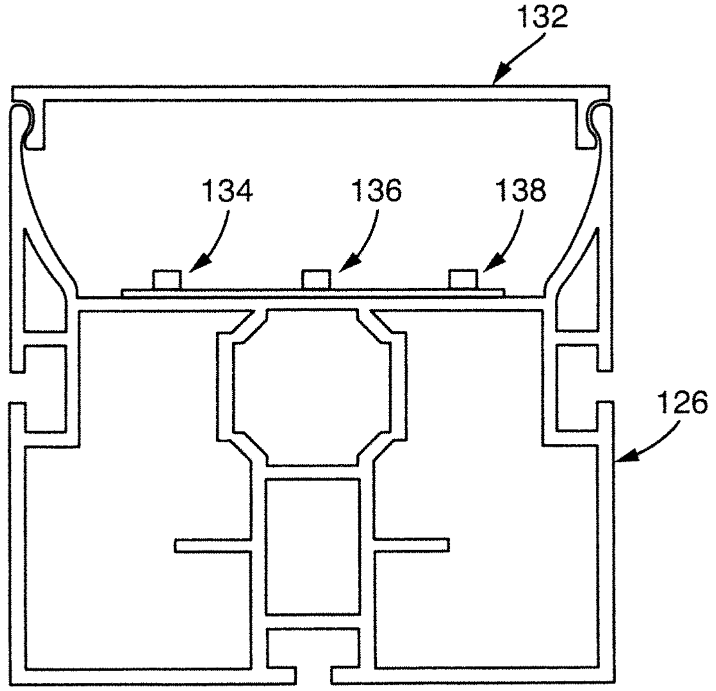
FIG. 9 shows the profile arrangement of FIG. 8 with a covering profile and LED lighting means.

FIG. 9 shows a profile arrangement according to the invention with the supporting profile 126 and a covering profile 132 of translucent polycarbonate placed onto the supporting profile 126. The covering profile 132 is of a substantially plate-shaped form, but has on both of its longitudinal edges grooves which are rounded and open towards the respective side and are made to match the projections at the free ends of the legs 128, 130. As a result, the covering profile 132 can be snap-fitted on the supporting profile 126 in a very easy way, in that it is pressed from above in FIG. 9 onto the free ends of the two legs 128, 130, until the inwardly protruding projections on the legs 128, 130 snap-fit into the respective groove on the longitudinal edges of the covering profile 132.

On the basis of the U-shaped cross section of the supporting profile 126, altogether three LED strips 134, 136, 138 can be seen, with in each case multiple LEDs arranged one behind the other and in line with one another and arranged on a common base. By means of the LED lighting strips 134, 136, 138, the inner side of the covering profile 132 can be uniformly illuminated, so that the outer side of the covering profile 132 is also uniformly illuminated, without the individual LEDs of the LED strips 134, 136, 138 being perceptible from outside the covering profile 132. The curved inner sides of the legs 128, 130 serve in this case for reflecting light onto the inner side of the covering profile 132 and as a result ensuring uniform illumination and avoiding shading.

Otherwise, the supporting profile 126 is likewise formed with hollow chambers and undercut grooves, which have already been explained on the basis of the supporting profile 10 of FIG. 1.

The invention claimed is:

1. A profile arrangement for setting up exhibition stands or shop fittings, the profile arrangement comprising:

a supporting profile, the supporting profile having at least one hollow chamber extending continuously in a longitudinal direction of the supporting profile, an inner side, an outer side facing away from the inner side towards an exterior environment of the profile arrangement, and at least two legs extending continuously in the longitudinal direction and having respective free terminal ends, each of the legs having an outer surface facing towards the exterior environment and an inner surface facing away from the outer surface and the supporting profile having snap-fitting means at the free terminal ends of the at least two legs;

a covering profile having snap-fitting means, an outer side facing the exterior environment and an inner side facing away from the outer side, the covering profile being constructed at least partly of light-transmissive material or being completely constructed of translucent plastic, the snap-fitting means of the supporting profile being configured to interact with the snap-fitting means of the covering profile to connect the covering profile to the supporting profile, the inner side of the covering profile in a connected state of the covering profile and the supporting profile being disposed in opposed relation with the inner side of the supporting profile; and LED lighting means disposed on the inner side of the supporting profile and during operation the LED lighting means radiate light in a direction of the inner side of the covering profile, each of the inner surfaces of the legs of the supporting profile being disposed and configured to receive light impinging thereon from the LED lighting means and to reflect the light onto the inner side of the covering profile, each of the inner surfaces having a tapered surface portion projecting towards the outer surface of a respective one of the legs as the inner surface extends in a direction towards the terminal free end of the respective leg.

2. The profile arrangement according to claim 1, wherein the covering profile has exactly two legs with respective outer sides and respective free ends, the outer sides of the legs of the covering profile being arranged perpendicularly to one another.

3. The profile arrangement according to claim 2, wherein the at least two legs of the supporting profile comprises exactly two legs, the outer sides of the two legs of the supporting profile being arranged at right angles to one another, and the snap-fitting means of the covering profile comprises snap-fitting means at the free ends of the legs of the covering profile, the snap-fitting means of the legs of the covering profile interacting with respective ones of the snap-fitting means of the legs of the supporting profile.

4. The profile arrangement according claim 2, wherein the legs of the supporting profile are arranged at an angle of 90 degrees to one another and the legs of the covering profile are arranged at an angle of 90 degrees to one another.

5. The profile arrangement according to claim 1, wherein, in the connected state of the supporting profile and the covering profile, the snap-fitting means on the supporting profile interact with the snap-fitting means on the covering profile, and the supporting profile and the covering profile form a rectangular or square cross-section.

6. The profile arrangement according to claim 1, wherein the LED lighting means comprises at least a first LED strip and a second LED strip with LEDs arranged in the longitudinal direction, a light radiating direction of the first and second strips being aligned substantially perpendicularly to one another.

7. The profile arrangement according to claim 6, further including a third LED strip with LEDs arranged in the longitudinal direction, a light radiating direction of the third LED strip being arranged at an angle of approximately 45 degrees or between 40 degrees and 50 degrees, to the light radiating direction of the first LED strip and to the light radiating direction of the second LED strip.

8. The profile arrangement according to claim 6, wherein the first and second LED strips with LEDs arranged in the longitudinal direction are arranged on a common, flexible substrate disposed on the inner side of the supporting profile.

9. The profile arrangement according to claim 1, wherein the LED lighting means comprises a plurality of LEDs, and the supporting profile has fastening areas for the LEDs, the fastening areas being arranged at least partially at an angle to one another.

10. The profile arrangement according to claim 1, wherein the LED lighting means comprises a plurality of LEDs, and the supporting profile has fastening areas for the LEDs, the fastening areas being arranged on a surface area of the supporting profile that is curved and continuous in the longitudinal direction of the supporting profile.

11. The profile arrangement according to claim 1, wherein the tapered surface portions of the respective legs of the supporting profile are curved.

12. The profile arrangement according to claim 1, wherein the inner surfaces of the legs of the supporting profile are mirrored, polished or white.

13. The profile arrangement according to claim 1, wherein the covering profile is formed in one piece from translucent polycarbonate.

14. The profile arrangement according to claim 1, wherein the covering profile comprises two legs with respective free ends and the snap-fitting means of the covering profile comprises snap-fitting means at each of the free ends of the legs of the covering profile, the snap-fitting means at the free terminal ends of the legs of the supporting profile each including a groove defined in one of the respective free terminal ends, the snap-fitting means of the legs of the covering profile being snap-fitted into the respective grooves of the legs of the supporting profile.

15. The profile arrangement according to claim 1, wherein the hollow chamber of the supporting profile has an octagonal cross-section.

16. The profile arrangement according to claim 1, wherein each of the outer sides of the legs of the supporting profile defines therein at least one undercut groove.

17. The profile arrangement according to claim 1, further comprising at least one of a voltage supply and a control unit for the LED lighting means disposed inside the hollow chamber of the supporting profile.

18. The profile arrangement according to claim 1, further comprising a plurality of the supporting profiles, a plurality of the covering profiles, vertical supports and horizontal frames, both the horizontal supports and the vertical frames respectively being formed by one of the supporting profiles and one of the covering profiles.

19. The profile arrangement according to claim 1, wherein in the connected state the covering profile forms at least one complete side face of the profile arrangement.

20. The profile arrangement according to claim 1, further comprising an elongate open space defined between the inner sides of the supporting profile and the covering profile, the LED lighting means being disposed on the inner side of the supporting profile within the open space, the inner sides of the supporting profile and the covering profile defining substantial portions of the open space and the tapered surface portions of the respective legs of the supporting profile defining parts of the open space.

21. A profile arrangement comprising:

a longitudinally elongated supporting profile having at least one hollow chamber extending continuously in a longitudinal direction of the supporting profile, an outer side facing towards an exterior environment of the supporting profile, an inner side facing away from the outer side, and first and second legs extending continuously in the longitudinal direction and having respective free outer terminal ends and respective inner surfaces facing away from the exterior environment;

a longitudinally elongate covering profile constructed at least partly of light-transmissive material or being completely constructed of translucent plastic, the covering profile having an outer side facing towards the exterior environment and an inner side facing away from the outer side of the covering profile, the free outer terminal ends of the respective legs of the supporting profile being configured for interlocking engagement with the covering profile to fix the covering profile to the supporting profile such that the inner side of the covering profile and the inner side of the supporting profile are in opposed relation and together at least partially define an elongated interior space extending continuously in the longitudinal direction along the profile arrangement, each of the inner surfaces of the respective first and second legs of the supporting profile facing the interior space and defining respective parts thereof and each being tapered such that the inner surfaces project toward the exterior environment as the inner surfaces extend toward the respective free outer terminal ends of the first and second legs of the supporting profile; and an LED lighting arrangement disposed on the inner side of the supporting profile within the interior space, the LED lighting arrangement during operation thereof radiating light towards the inner side of the covering profile.

22. The profile arrangement according to claim 21, wherein each of the inner surfaces of the first and second legs of the supporting profile are disposed and configured to receive light impinging thereon from the LED lighting arrangement and to reflect the light onto the inner side of the covering profile.

* * * * *